(12) United States Patent
Burkholder et al.

(10) Patent No.: US 7,081,698 B1
(45) Date of Patent: Jul. 25, 2006

(54) EFFICIENT MOTOR

(75) Inventors: Robert F. Burkholder, Jackson, TN (US); Dalton McFarland, Medina, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/901,912

(22) Filed: Jul. 29, 2004

Related U.S. Application Data

(60) Provisional application No. 60/492,209, filed on Jul. 31, 2003, provisional application No. 60/565,890, filed on Apr. 28, 2004.

(51) Int. Cl.
*H02K 1/22* (2006.01)
(52) U.S. Cl. .................. 310/261; 310/216; 310/254
(58) Field of Classification Search ........ 310/216–218, 310/254, 258, 259, 261, 264, 269, 233
See application file for complete search history.

(56) References Cited

U.S. PATENT DOCUMENTS

| | | | | | |
|---|---|---|---|---|---|
| 2,107,872 | A | * | 2/1938 | Hayes | 310/218 |
| 2,560,560 | A | * | 7/1951 | Doherty | 310/259 |
| 3,686,524 | A | * | 8/1972 | Hall | 310/154.22 |
| 6,005,321 | A | * | 12/1999 | Bolton et al. | 310/168 |
| 6,762,531 | B1 | * | 7/2004 | Gilliland et al. | 310/254 |

* cited by examiner

*Primary Examiner*—Thanh Lam
(74) *Attorney, Agent, or Firm*—Joseph F. Key

(57) ABSTRACT

The present invention is directed to a method and system for improving motor efficiency. The motor of the present invention may provide at least 1.9 Horsepower (HP) while drawing 15–16 Amperes at 120 Volts. The motor of the present invention may provide at least 75% efficiency and the speed of 12,000 to 14,000 RPM. A small size and low weight motor may be provided by the present invention. Further, it is contemplated that the motor of the present invention may be produced at a low cost per unit with a volume of 500,000 to 1,000,000 units per year. It is also contemplated that the motor may be suitable for use in consumer and professional products by complying with recognized safety standards such as U.L., CSA, CEE and the like.

20 Claims, 23 Drawing Sheets

LNHP MOTOR DYNO DATA
DESCRIPTION:
2.5 IN STACK SEMI-PROCESSED STEEL
2 WELD FIELD
FIELD COIL 37T 14AWG
ARM COIL 7TP 8T 19.5AWG
SINGLE .260 W .004THK SPRINGS

| LOAD (INLB) | VOLTS | AMPS | WATTS IN REAL | WATTS OUT REAL | RPM | HORSE POWER | EFFICIENCY | POWER FACTOR |
|---|---|---|---|---|---|---|---|---|
| 1.476 | 120.63 | 5.961 | 707.90 | 346.65 | 19764 | 0.465 | 0.490 | 0.982 |
| 2.000 | 120.53 | 6.646 | 788.47 | 443.29 | 18732 | 0.596 | 0.562 | 0.984 |
| 3.000 | 120.36 | 7.900 | 927.06 | 600.88 | 17033 | 0.811 | 0.651 | 0.975 |
| 4.000 | 120.19 | 9.192 | 1068.60 | 746.60 | 15775 | 1.002 | 0.699 | 0.967 |
| 5.000 | 120.14 | 10.450 | 1206.40 | 878.26 | 14847 | 1.179 | 0.728 | 0.961 |
| 6.000 | 120.51 | 11.905 | 1373.00 | 1015.70 | 14295 | 1.363 | 0.740 | 0.957 |
| 7.000 | 120.33 | 13.134 | 1496.70 | 1126.00 | 13563 | 1.511 | 0.751 | 0.948 |
| 8.000 | 120.10 | 14.015 | 1660.80 | 1253.80 | 13230 | 1.683 | 0.755 | 0.946 |
| 8.500 | 120.09 | 15.059 | 1723.60 | 1298.50 | 13219 | 1.743 | 0.753 | 0.953 |
| 9.000 | 120.83 | 15.964 | 1822.40 | 1373.40 | 12905 | 1.843 | 0.754 | 0.946 |
| 9.494 | 120.64 | 16.508 | 1879.90 | 1421.20 | 12675 | 1.906 | 0.756 | 0.944 |

FIG. 19A

LNHP MOTOR DYNO DATA
DESCRIPTION:  3.0 IN STACK SEMI-PROCESSED STEEL
2 WELD FIELD
FIELD COIL 31T 14AWG
ARM COIL 7TP 9T 19.5AWG
SINGLE .260 W .004THK SPRINGS

| LOAD (IN.LB) | VOLTS | AMPS | WATTS IN REAL | WATTS OUT REAL | RPM | HORSE POWER | EFFICIENCY | POWER FACTOR |
|---|---|---|---|---|---|---|---|---|
| 1.278 | 120.83 | 5.825 | 698.66 | 276.11 | 18019 | 0.371 | 0.395 | 0.993 |
| 2.000 | 120.67 | 6.469 | 776.78 | 394.71 | 16701 | 0.530 | 0.508 | 0.992 |
| 3.000 | 120.56 | 7.594 | 906.53 | 548.51 | 15402 | 0.738 | 0.606 | 0.990 |
| 4.000 | 120.43 | 8.862 | 1031.30 | 677.12 | 14310 | 0.909 | 0.657 | 0.988 |
| 5.000 | 120.36 | 9.567 | 1134.00 | 792.98 | 13367 | 1.064 | 0.699 | 0.985 |
| 6.000 | 120.26 | 10.400 | 1230.90 | 894.42 | 12940 | 1.201 | 0.727 | 0.984 |
| 7.000 | 120.18 | 11.369 | 1347.30 | 993.65 | 11988 | 1.334 | 0.738 | 0.984 |
| 8.000 | 120.07 | 12.304 | 1455.90 | 1082.20 | 11445 | 1.453 | 0.744 | 0.980 |
| 9.000 | 120.78 | 13.356 | 1574.90 | 1177.10 | 11041 | 1.580 | 0.747 | 0.976 |
| 10.000 | 120.63 | 14.297 | 1681.00 | 1257.60 | 10652 | 1.688 | 0.748 | 0.975 |
| 11.000 | 120.54 | 15.472 | 1809.00 | 1343.00 | 10295 | 1.803 | 0.742 | 0.970 |
| 12.000 | 120.43 | 16.506 | 1922.60 | 1421.00 | 9820 | 1.907 | 0.739 | 0.967 |

FIG. 19B

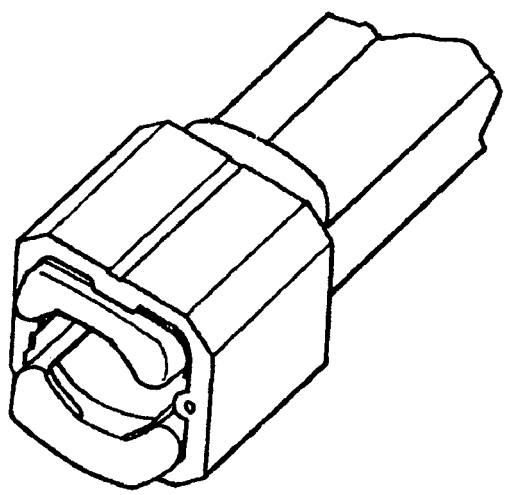
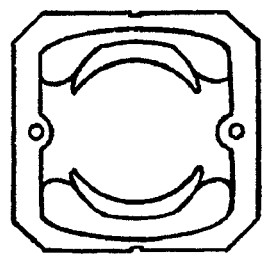
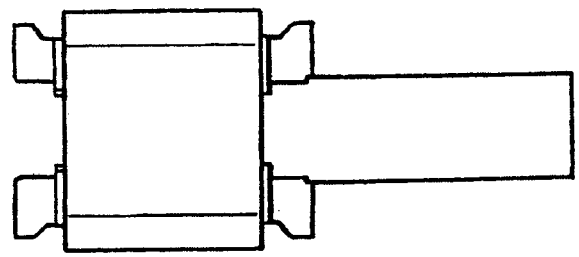
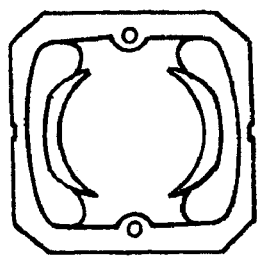
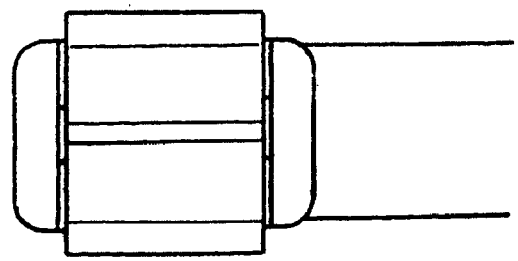
FIG. 22

|  | NEW 2.5 INCH MOTOR | NEW 3.0 INCH MOTOR | PRIOR ART 3.0 INCH MOTOR |
|---|---|---|---|
| GENERAL DATA | | | |
| Rated Output Power (kW): | 1.42 | 1.42 | 1.02 |
| Rated Voltage (V): | 120 | 120 | 120 |
| Frequency (Hz): | 60 | 60 | 60 |
| Number of Poles: | 2 | 2 | 2 |
| Given Rated Speed (rpm): | 12600 | 9900 | 14600 |
| Frictional Loss (W): | 130 | 130 | Unknown |
| Brush Displacement: | 23 | 23 | 33.7 |
| Operating Temperature (C): | 75 | 75 | 75 |
| ROTOR DATA | | | |
| Number of Rotor Slots: | 22 | 22 | 16 |
| Outer Diameter of Rotor (inch): | 2.15 | 2.15 | 2.062 |
| Inner Diameter of Rotor (inch): | 0.472 | 0.472 | .75 |
| Length of Rotor Core (inch): | 2.5 | 3 | 3 |
| Stacking Factor of Rotor Core: | 0.95 | 0.95 | 0.95 |
| Type of Steel: | 2.6 Watt/lb | 2.6 Watt/lb | 2.6 Watt/lb |
| Slot Insulation Thickness (inch): | 0.012 | 0.012 | 0.012 |
| Number of Conductors Per Slot | 16 | 18 | 20 |
| Type of Armature Winding: | Lap Winding | Lap Winding | Lap Winding |
| Call Pitch: | 7 | 7 | 8 |
| Number of Wires per Conductor: | 1 | 1 | 1 |
| Wire Diameter (inch): | 0.034 | 0.034 | 0.034 |
| STATOR POLE | | | |
| Minimum Air Gap (inch): | 0.015 | 0.015 | 0.02 |
| Outer Diameter (inch): | 4.5 | 4.5 | 3.685 |
| Overall Width (inch): | 3.625 | 3.625 | 3.625 |
| Length of Stator (inch): | 2.5 | 3 | 3 |
| Stacking Factor of Iron Core: | 0.95 | 0.95 | 0.95 |
| Type of Steel | 2.6 Watt/lb | 2.6 Watt/lb | 2.6 Watt/lb |
| Physical Pole Embrace: | 0.62311 | 0.62311 | 0.75 |
| Pole Width (inch): | 0.825 | 0.825 | 1.1 |
| STATOR COIL | | | |
| Pole Insulation (inch): | 0.025 | 0.025 | 0.025 |
| End Adjustment (inch): | 0.125 | 0.125 | 0.125 |
| Coil Turns per Pole: | 37 | 31 | 40 |
| Number of Wires per Conductor: | 1 | 1 | 1 |
| Wire Diameter (Inch) | 0.0641 | 0.0641 | 0.054 |
| COMMUTATOR & BRUSH DATA | | | |
| Type of Commutator: | Cylinder Type | Cylinder Type | Cylinder Type |
| Commutator Diameter (inch): | 1.2 | 1.2 | 1.75 |
| Commutator Length (inch): | 0.8 | 0.8 | 0.875 |
| Commutator Insulation (inch): | 0.02 | 0.02 | 0.02 |
| Brush Width (inch): | 0.29 | 0.29 | 0.3 |
| Brush Length (inch): | 0.5 | 0.5 | 0.475 |
| WEIGHTS | | | |
| Armature Copper Weight (lb): | 0.542414 | 0.667965 | Unknown |
| Field Copper Weight (lb): | 0.80033 | 0.73481 | Unknown |
| Armature Core Steel Weight (lb): | 1.40743 | 1.68892 | Unknown |
| Stator Core Steel Weight (lb): | 3.97991 | 4.77589 | Unknown |
| Total Net Weight (lb): | 6.73008 | 7.86758 | 7.4 |
| RESISTANCES | | | |
| Field Winding Resistance (ohm): | 0.204455 | 0.187717 | 0.292 |
| Armature Winding Resistance (ohm): | 0.437488 | 0.538752 | 0.74 |

FIG. 25

EFFICIENT MOTOR

CROSS REFERENCE TO RELATED APPLICATION

The present application claims priority under 35 U.S.C. §119 to the U.S. Provisional Application Ser. No. 60/492,209, filed on Jul. 31, 2003 and the U.S. Provisional Application Ser. No. 60/565,890, filed on Apr. 28, 2004, which are herein incorporated by reference in their entirety.

FIELD OF THE INVENTION

The present invention generally relates to the field of electric motors, and more particularly to a method and system for improving motor efficiency.

BACKGROUND OF THE INVENTION

Electric motors are widely utilized to provide increased functionality in many of the devices utilized today. There are a variety of motor types available to suit electrical drive power needs. AC induction motors and DC motors are the most common but other motor designs such as synchronous, switched reluctance and permanent magnetic motors are used in various applications. Among the various motors, some DC motors may be used for power tools powered by batteries to provide mobility and flexibility in their use. For example, a cordless drill powered by a rechargeable battery allows a consumer to easily transport and use the drill in locations in which a corded power drill may not be useable. Since power tools need to provide a sufficient amount of torque it is desirable that the electric motor is an efficient as possible to provide the greatest amount of horsepower. With respect to battery-powered tools, efficiency in the electric motor is necessary to sustain longer battery life.

The universal motor is a rotating electric machine similar to a DC motor but designed to operate either from direct current or single-phase alternating current. Universal motors may include a rotor with a field that will oppose the field in the stator at any given moment, regardless of the polarity of the supply current changes with time. Universal motors usually run at high speeds such as 3,500 to 40,000 revolutions per minute (RPM). This results in a high power-to-weight and power-to-size ratio, making it desirable for hand-held tools, vacuum cleaners and sewing machines. However, the price of versatility is efficiency; universal motors are not as efficient (with average efficiency of 62%) as similarly-constructed AC and DC series motors.

The electrical motor utilized in the power tool significantly contributes to the overall size and weight of the power tool. Another factor of electrical motors lies in the manufacturing cost. The manufacturing cost of an electric motor contributes to a great percentage of the overall cost of the power tool. A reduction in this cost may be reflected in the cost of the power tool. Consequently, an electric motor including a universal motor and a DC motor supported by battery power that is more efficient, occupies less space, and less costly to manufacture is necessary.

SUMMARY OF THE INVENTION

Accordingly, the present invention is directed to a method and system for improving motor efficiency. The motor of the present invention may provide at least 1.9 Horsepower (HP) while drawing 15–16 Amperes at 120 Volts. In a first aspect of the present invention, the motor may be a universal motor providing 75% efficiency and the speed of 12,000 to 14,000 RPM. An optimized design geometry in the laminations may reduce winding resistance in the rotor and increase the cross sectional area of the rotor core. In an advantageous aspect of the present invention, the proportion of material in the shaft as related to the proportion of material in the armature lamination yoke may be reduced to minimize energy losses due to the magnetic material losses in the shaft.

In a second aspect of the present invention, the motor may be a brushless DC motor delivering the minimal 1.9 horsepower at 12,000 to 14,000 RPM while drawing 15–16 Amperes at 120 Volts. It is contemplated that the motor of the present invention may be produced at a cost of $25–$30 per unit with a volume of 500,000 to 1,000,000 units per year, this cost including electronic control to achieve basic motor operation.

In general, a small size and low weight motor may be provided by the present invention. It is also contemplated that the motor may be suitable for use in consumer and professional products by complying with recognized safety standards such as U.L., CSA, CEE and the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 19A is a table showing performance data resulting from the testing of a universal motor 2.5 inches in length that utilizes the motor technology of the present invention;

FIG. 19B is a table showing performance data resulting from the testing of a universal motor 3.0 inches in length that utilizes the motor technology of the present invention;

FIG. 22 depicts a field assembly in accordance with a preferred embodiment of the present invention;

FIG. 25 is a table showing data of armature and stator windings in an embodiment in accordance with the present invention and the prior art motor.

DETAILED DESCRIPTION OF THE INVENTION

Reference will now be made in detail to the presently preferred embodiments of the invention, examples of which are illustrated in the accompanying drawings.

Referring generally now to FIGS. 1 through 27, exemplary embodiments of the present invention are shown. Motors in accordance with the present invention may improve motor efficiency, size and manufacturing cost. In an embodiment of the present invention, the motor may be a brushless DC motor operable by battery power. The brushless DC motor may provide at least 1.9 Horsepower while drawing 15–16 Amperes at 120 Volts. In another embodiment of the present invention, the motor may be a universal motor operable by both AC and DC power. The universal motor may also provide at least 1.9 Horsepower (HP) with 75% efficiency while drawing 15–16 Amperes at 120 Volts AC. Additionally, an optimized design geometry in the laminations may reduce winding resistance in the rotor and increase the cross sectional area of the rotor core.

Figure 1:
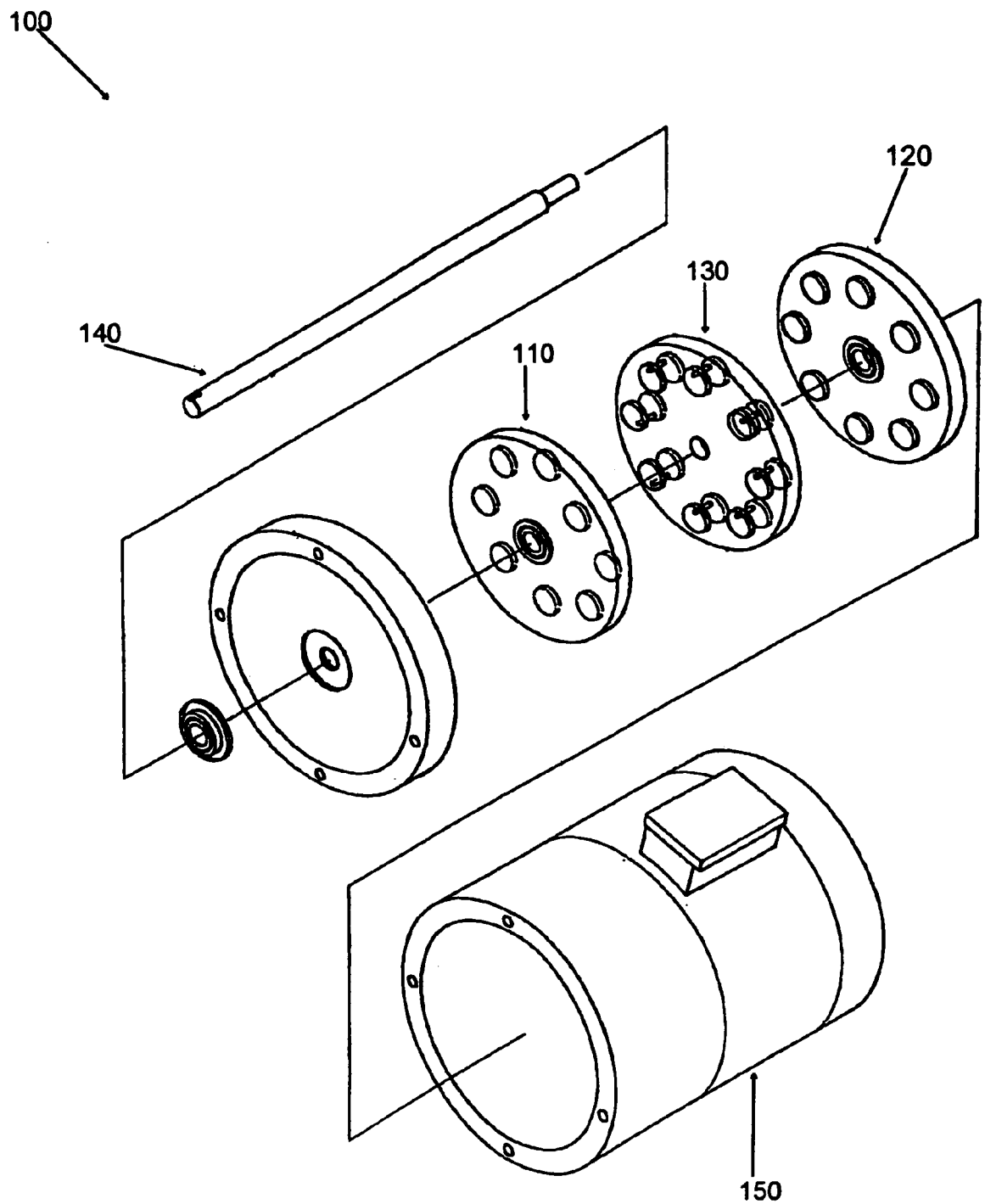
FIG. 1 depicts an illustration of a brushless DC motor in accordance with an embodiment of the present invention.

Referring to FIG. 1, a motor 100 in accordance with the present invention is shown. Motor 100 may be a brushless motor including a first outer disk 110 and second outer disk 120 with an intermediate disk 130 being disposed between the first and second outer disks. Alternatively, the motor may include a plurality of intermediate disks. The first outer disk 110 and second outer disk 120 may include at least one permanent magnet attached to each of the first outer disk 110 and the second outer disk 120. The permanent magnet may be formed of iron, cobalt, samarium and vanadium. In an embodiment of the invention, first outer disk 110 and second outer disk 120 may rotate with a rotary shaft 140, the first outer disk 110 and second outer disk 120 operating as rotors in the motor 100.

Intermediate disk 130 may have two sides, a center, and a circumference. In an embodiment of the invention, the intermediate disk 130 may be equidistant from the first outer disk 110 and the second outer disk 120. The intermediate disk 130 may be formed of insulating material with each of the two sides of the intermediate disk 130 having single layer coils distributed between the circumference and center of the intermediate disk 130. Each of the single layer coils of one side of the intermediate disk 130 may be electrically interconnected with a corresponding one of the single layer coils of the other side of the intermediate disk 130. Intermediate disk 130 may remain stationary with respect to the housing 150 that may surround the components of motor 100 and consequently may function as the stator of the motor 100.

Rotary shaft 140 may be disposed through the housing, through a center of each of the first and second outer disks 110, 120 and the intermediate disk 130. The rotary shaft 140 may be fixedly attached to the first outer disk 110 and the second outer disk 120 such that the rotary shaft 140 and the first and second outer disks 110, 120 rotate in unison.

It is contemplated that single layer coils that are located on each side of intermediate disk may have a set of characteristics in order to optimize performance of the motor 100. For example, the single layer coils may be spiral-shaped. The single layer coils may be thick films formed by a thick film process. The single layer coils may have a current capacity of at least 25 Amperes and a cross-section of a conductor in each of the single layer coils may measure 200 microns in height and 1 centimeter in width.

Figure 2:
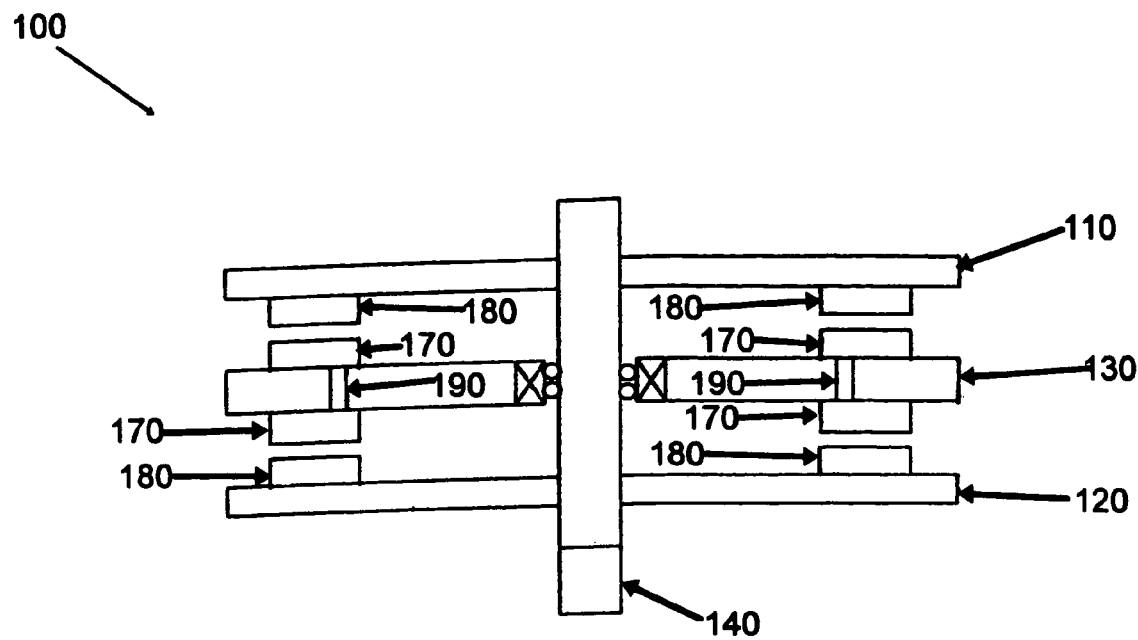
FIG. 2 depicts a side view of the motor as shown in FIG. 1.

Referring to FIG. 2, a side view of a motor as shown in FIG. 1 is shown. Permanent magnets 180 may be attached towards the circumference of the first and second outer disks 110, 120 corresponding to one or more single layer coils 170. Electrical interconnection 190 may couple each of the single layer coils 170 of one side of the intermediate disk 130 with a corresponding one of the single layer coils 170 of the other side of the intermediate disk 130.

Figure 3:
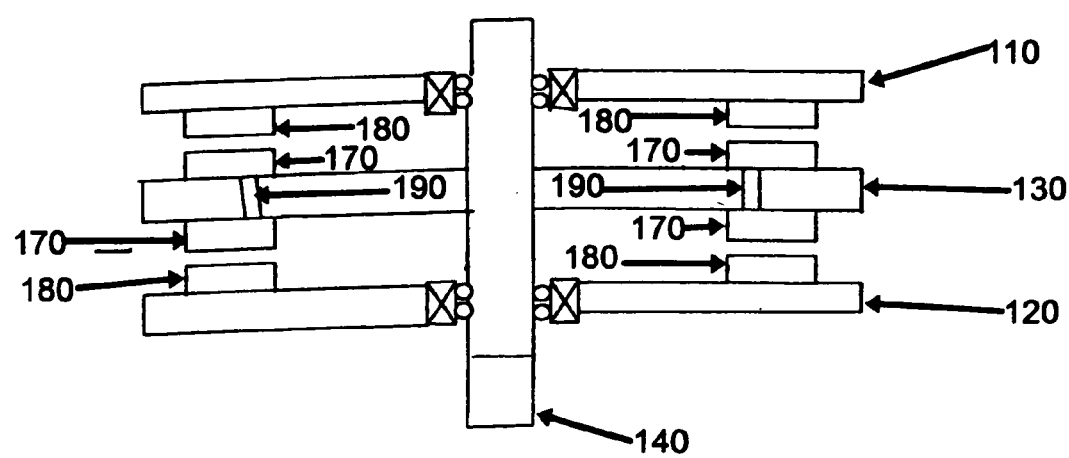
FIG. 3 depicts a side view of an alternative embodiment of the motor of FIG. 1 in which an intermediate disk rotates with the rotary shaft and the first and second outer disks are stationary with respect to the housing of the motor.
Figure 4:
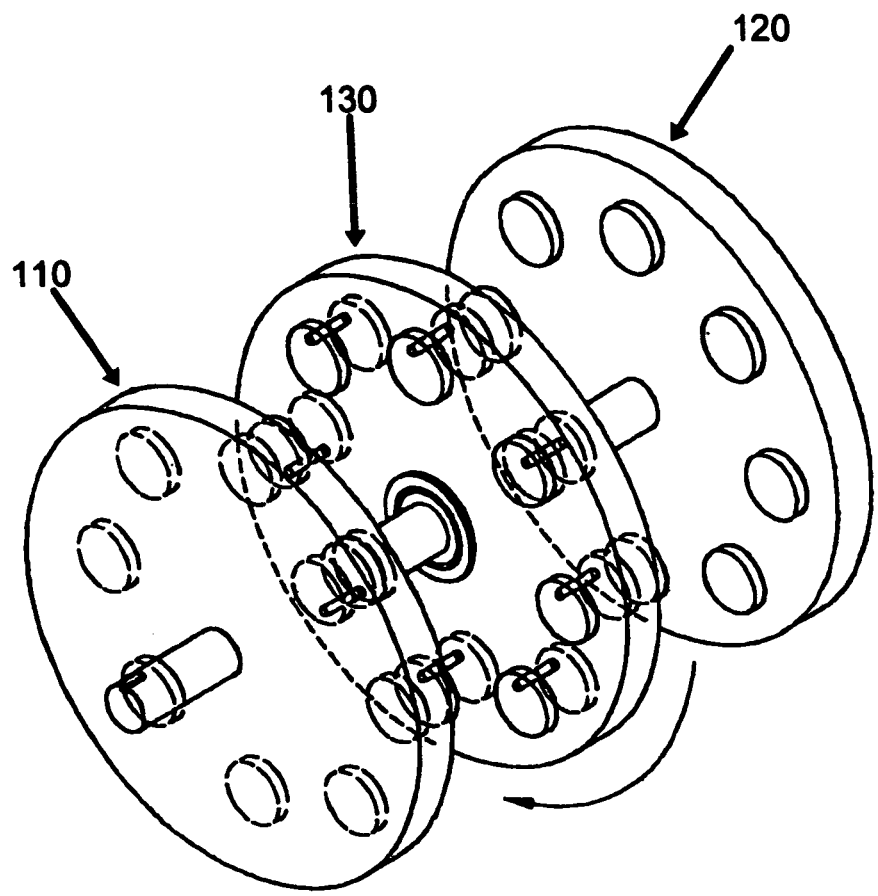
FIGS. 4 and 5 depict a perspective view in which the intermediate disk and first and second outer disks are rotatable with respect to the housing.
Figure 5:
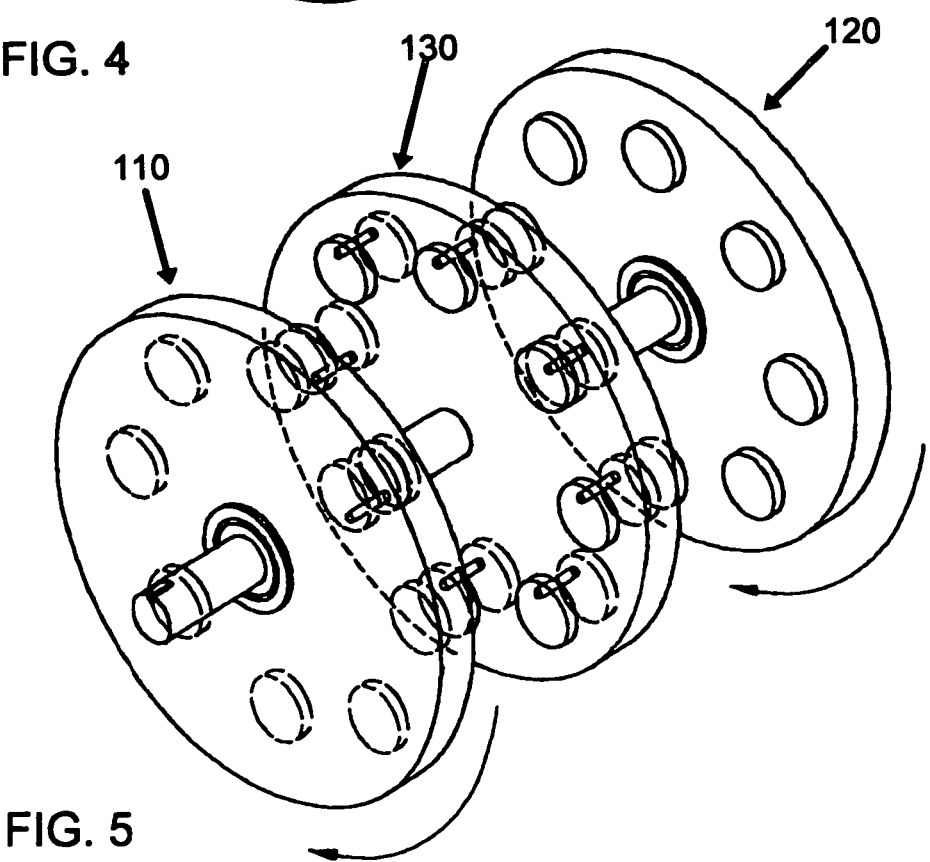

Referring to FIG. 3, a side view of an alternative embodiment of a motor of FIG. 1 in which intermediate disk 130 rotates with the rotary shaft 140 and the first and second outer disks 110, 120 are stationary with respect to the housing of the motor is shown. Referring to FIGS. 4 and 5, a perspective view in which the intermediate disk and first and second outer disks are rotatable with respect to the housing is shown. It is contemplated in yet another alternative embodiment of the present invention is that each of the first outer disk 110, second outer disk 120 and the intermediate disk 130 may rotate with respect to the housing.

Figure 6:
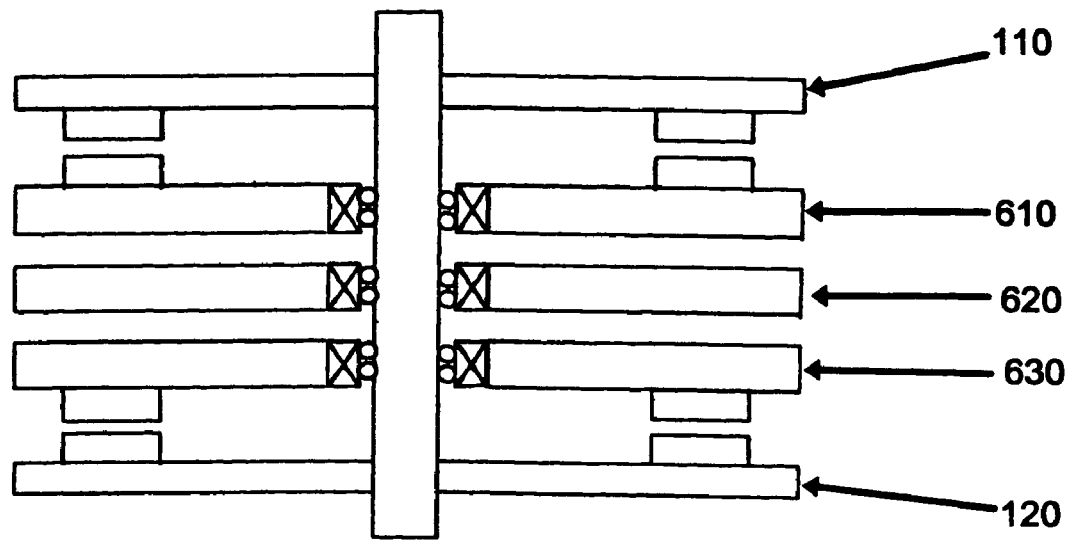
FIGS. 6 and 7 depict a side view of additional alternative embodiments of the motor of the present invention.
Figure 7:
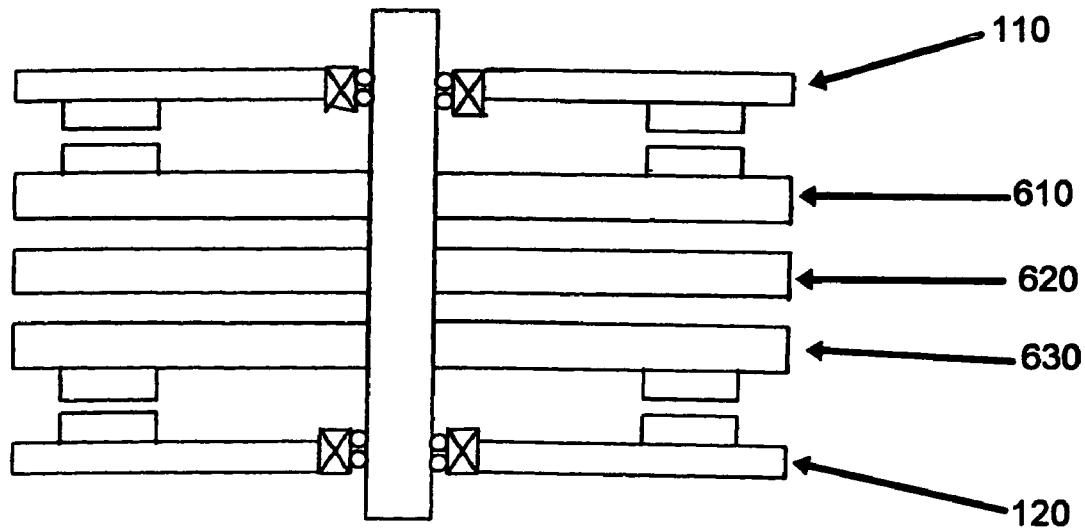
Figure 8:
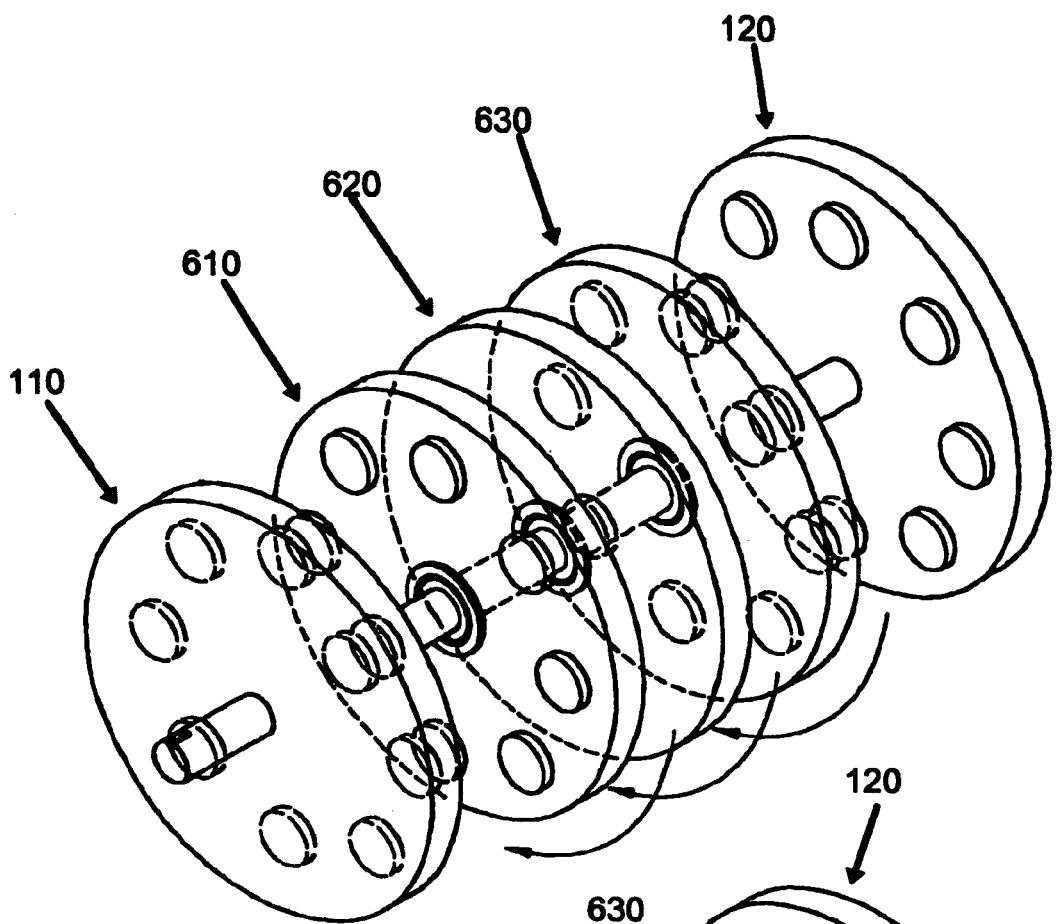
FIGS. 8 and 9 depict a perspective view of the rotational movement of the disks of the alternative embodiments of the motor of FIGS. 6 and 7.
Figure 9:
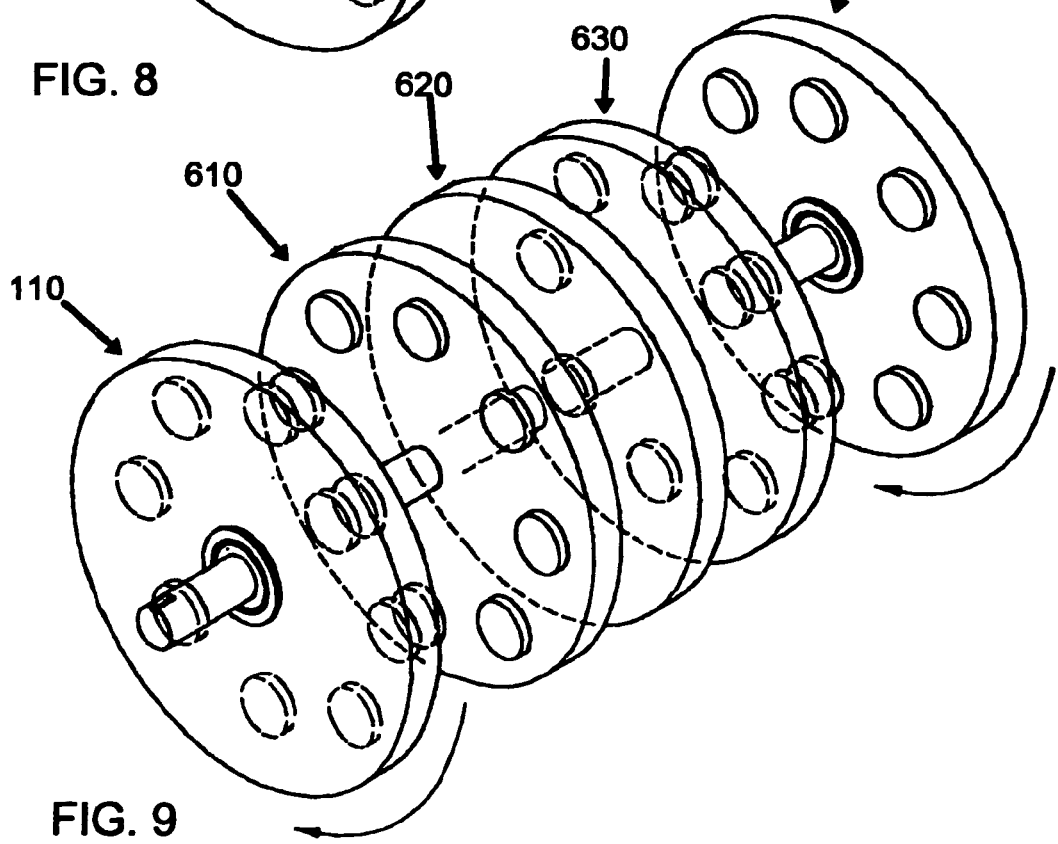

Referring to FIGS. 6 and 7, side views of additional alternative embodiments of the motor of the present invention are shown. Three separate intermediate disks 610–630 rather than the single intermediate disk 130 of FIG. 1 may be included in the motor design. Disk 610 and 630 may be similar to individual sides of the intermediate disk 130 of FIG. 1. Disk 620 may be a metal plate. Advantageously, disk 620 including a metal plate may increase efficiency of the motor. First and second outer disks 110, 120 may rotate in unison with rotary shaft 140. The motor design of FIG. 7 may include separate disks 610–630 that rotate in unison with rotary shaft 140. Referring to FIGS. 8 and 9, perspective views of the rotational movement of the disks of the alternative embodiments of the motor of FIGS. 6 and 7 are shown.

Figure 10:
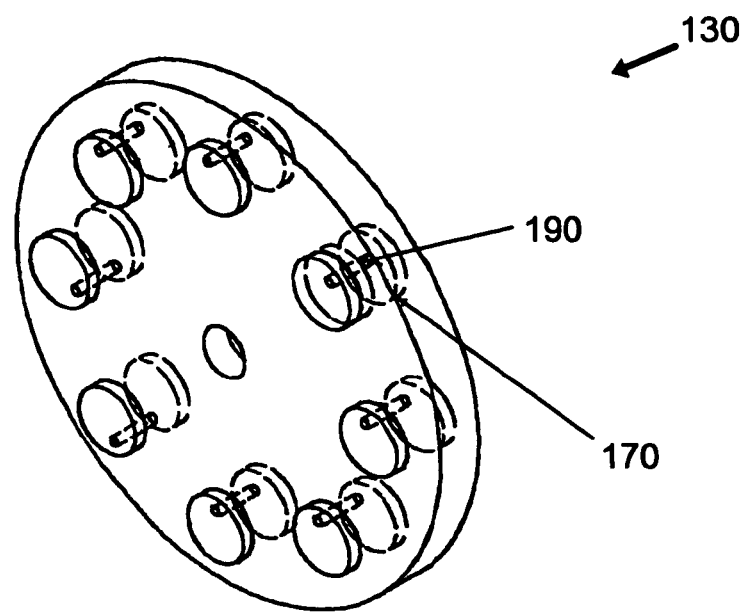
FIGS. 10 and 11 depict detailed views of the intermediate disk of the motor of FIG. 1.
Figure 11:
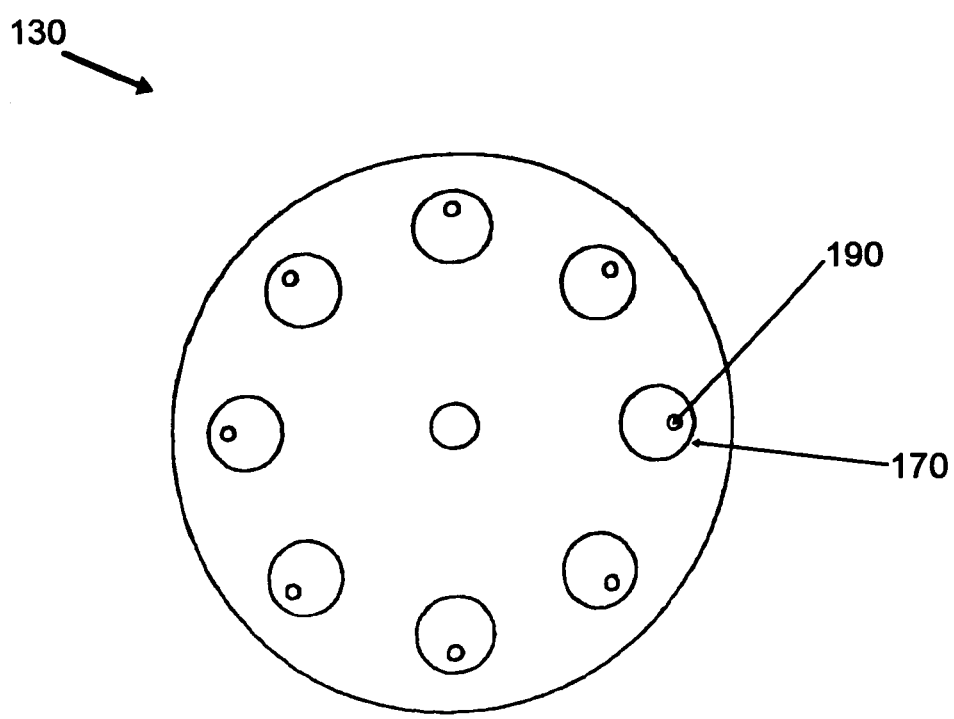

Referring to FIGS. 10 and 11, detailed views of the intermediate disk 130 of the motor of FIG. 1 are shown. In FIG. 10, a perspective view of the intermediate disk 130 is shown. Intermediate disk 130 may include a plurality of single layer coils 170 disposed on each side of the intermediate disk 130. An electrical interconnection 190 may couple a single layer coil 170 on one side of the intermediate disk 130 with another corresponding single layer coil on a second side of the intermediate disk 130. FIG. 11 depicts a side view of an intermediate disk 130 of the motor of FIG. 1. Single layer coils 170 are shown along with the electrical interconnection 190. Also shown in FIG. 11 is an aperture in which a rotary axis 140 of the motor 100 of FIG. 1 may be disposed.

Figure 12:
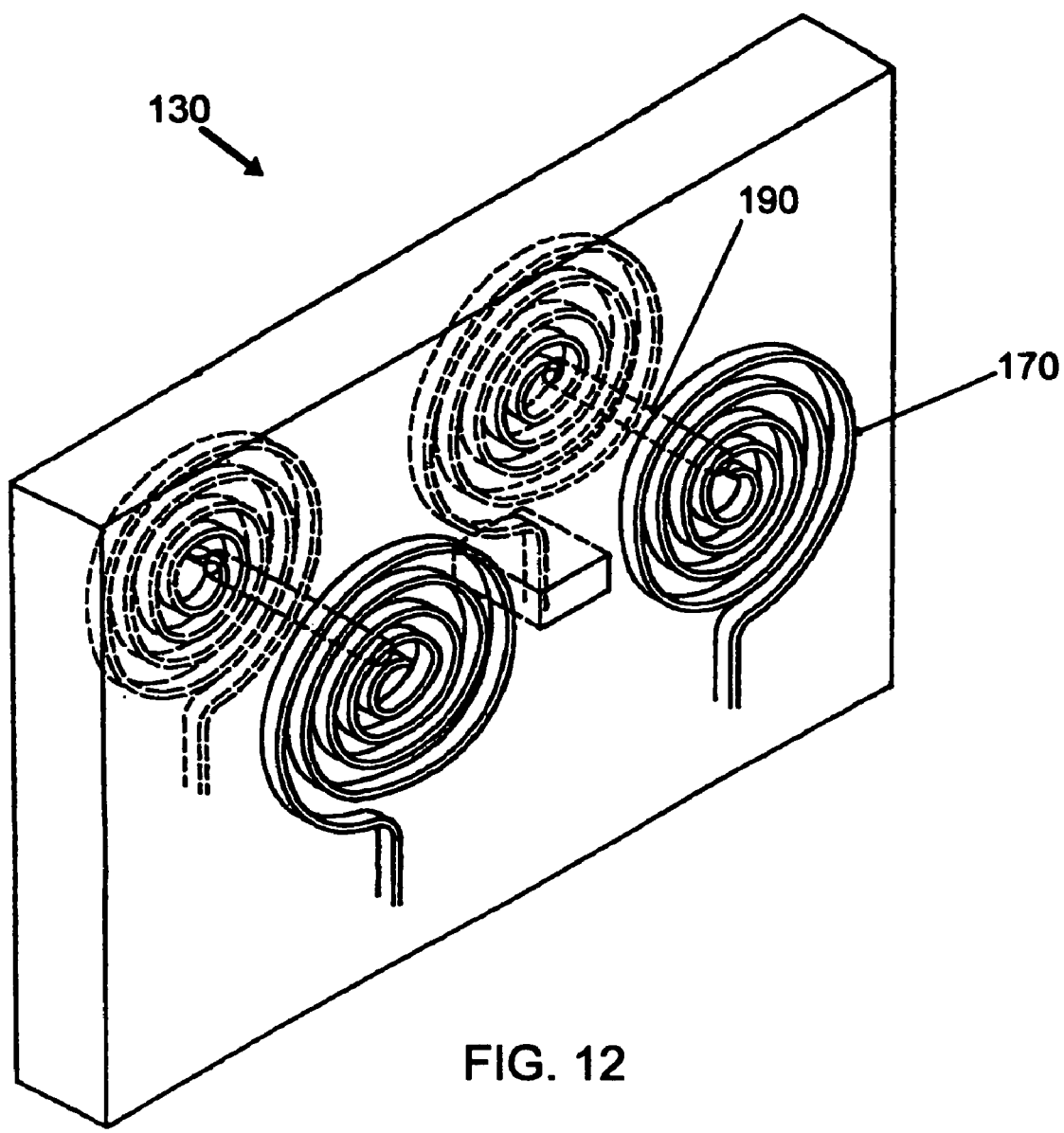
FIG. 12 depicts a detailed view of a single layer coil in accordance with the present invention.

Referring to FIG. 12, a detailed view of a single layer coil 170 in accordance with the present invention is shown. A single layer coil 170 may be disposed on each side of an intermediate disk 130 of the motor 100 of FIG. 1. Electrical interconnect 190 provides a coupling, through the intermediate disk 130, for a single layer coil disposed on a first side of the intermediate disk 130 and a corresponding single layer coil 170 disposed on a second side of the intermediate disk 130.

Figure 13:
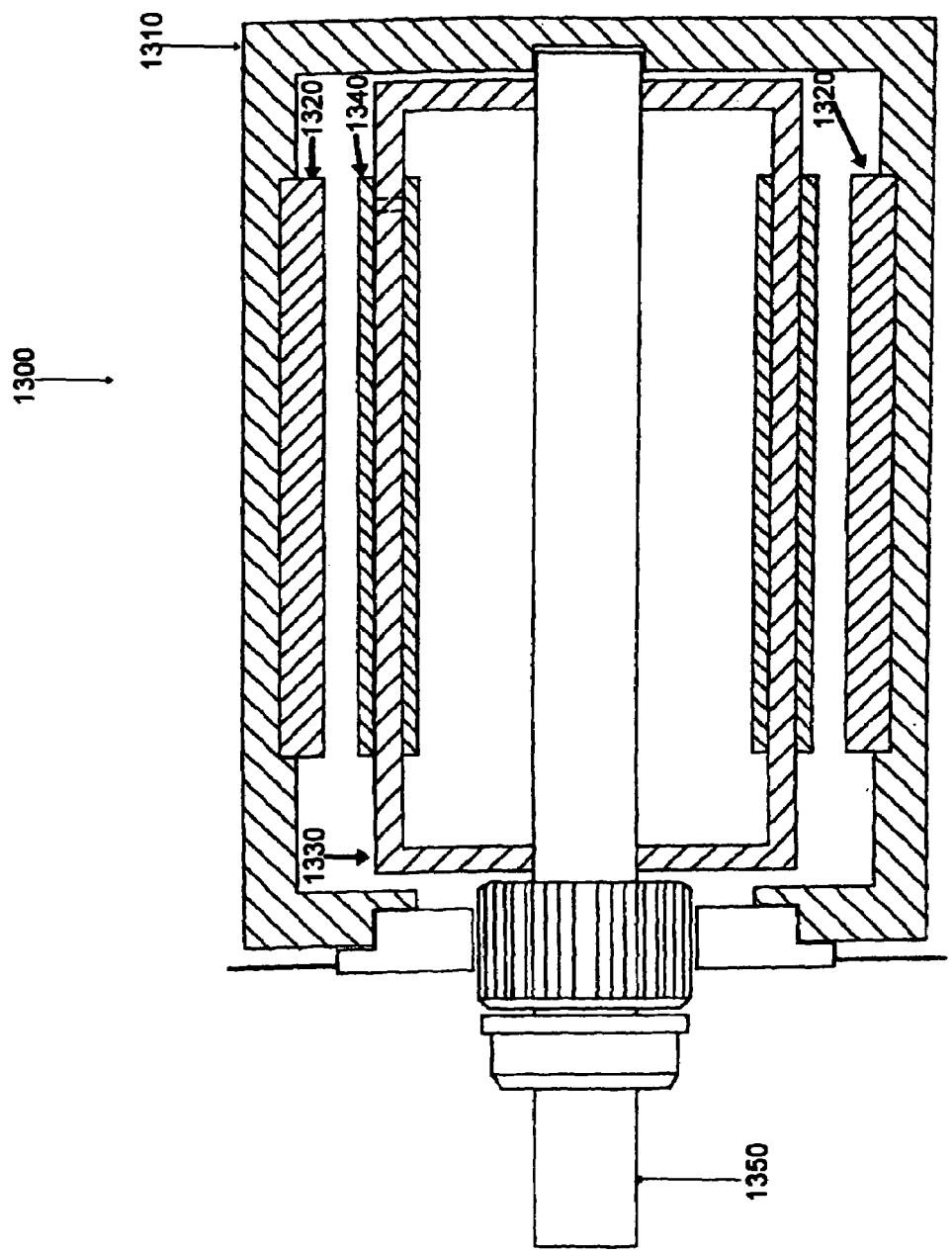
FIG. 13 depicts a motor in accordance with an alternative embodiment of the present invention.

Referring to FIG. 13, a motor 1300 in accordance with an alternative embodiment of the present invention is shown. Motor 1300 may include a housing 1310 having inner cylindrical walls defining a cylindrical cavity. Permanent magnets 1320 may be secured to the inner walls. A hollow rotor shell 1330 may be secured within the motor housing 1310. The hollow rotor shell 1330 may have a single layer of windings 1340 secured to the outside surface of the rotor shell 1330. A rotary shaft 1350 may pass through the rotor shell 1330, the rotor shell 1330 being secured to the rotary shaft 1350. Motor 1300 may operate such that when one of the windings is energized by the passing of an electrical current, magnetic flux may be generated from that one of the windings causing the rotor shell 1330 to rotate further causing the rotary shaft 1350 to rotate.

Figure 14:
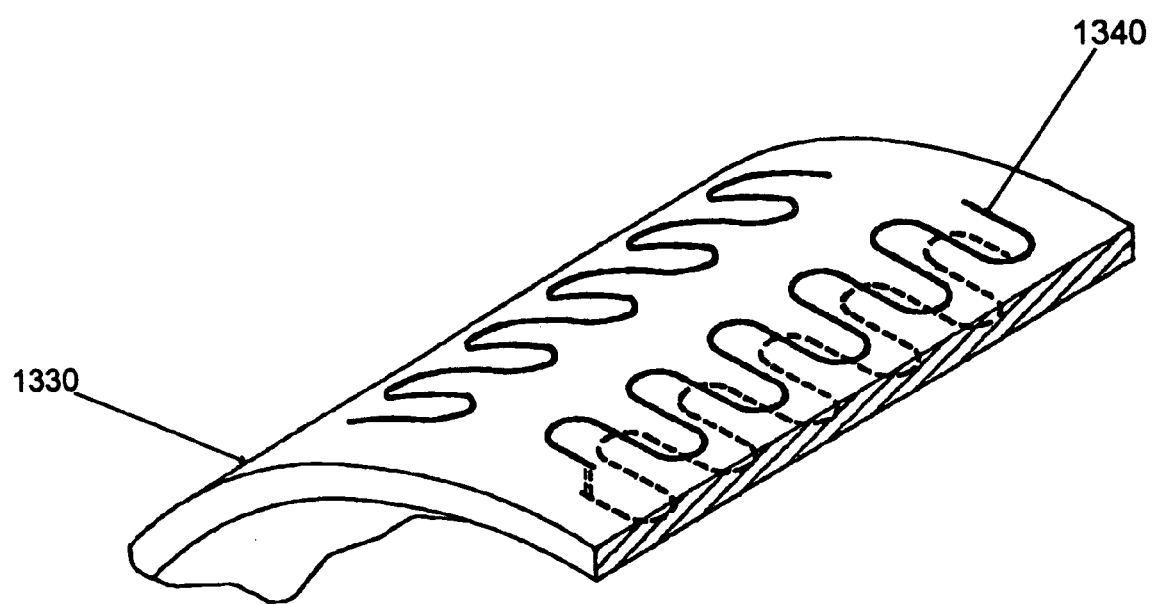
FIG. 14 depicts a detailed view of a rotor shell of the motor of FIG. 13.

Referring to FIG. 14, a detailed view of the outer surface of a rotor shell 1330 of the motor 1300 of FIG. 13 is shown. A layer of windings 1340 may be placed upon the outer surface of the rotor shell 1330. The layer of windings 1340 may be formed in a zig-zag fashion. It is contemplated that various methods exist for placing the layer of windings 1340 upon the rotor shell 1330. For example, conductive ink may be utilized. Printed circuit board technology may also be utilized.

Figure 15:
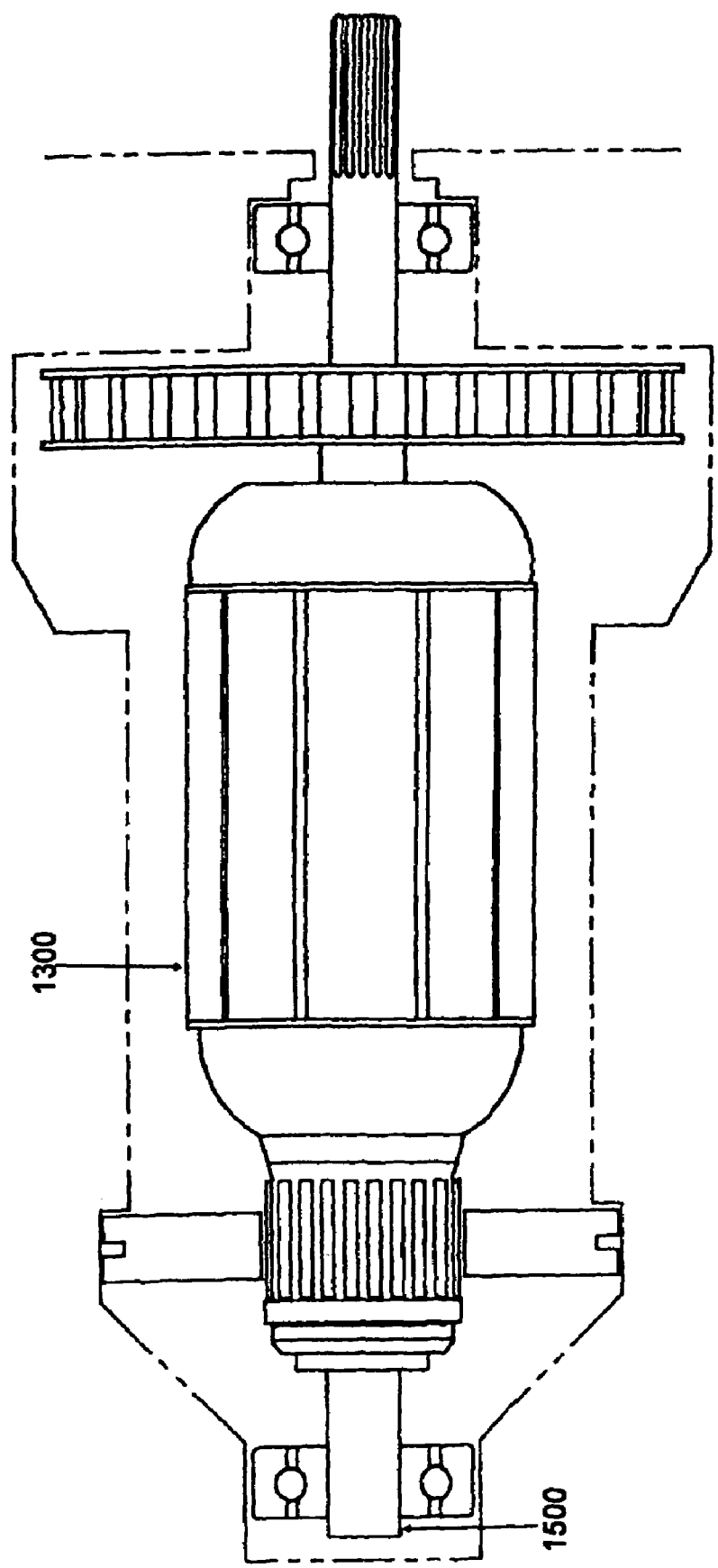
FIG. 15 depicts a view of the incorporation of a motor of FIG. 13 with a power tool.

FIG. 15 depicts a motor 1300 of FIG. 13 and its incorporation within a power tool. Rotary shaft 1350 (FIG. 13) may be coupled to a tool attachment 1500, a drill bit receiver, for example. Torque caused by the motor 1300 of the present invention may cause the rotary shaft 1350 (FIG. 13) to rotate further causing the drill bit receiver to rotate. It is contemplated that the motors disclosed in the present application may be utilized in DC and AC applications. Further, it is contemplated that the motors disclosed in the present application may be powered by a rechargeable battery.

Figure 16:
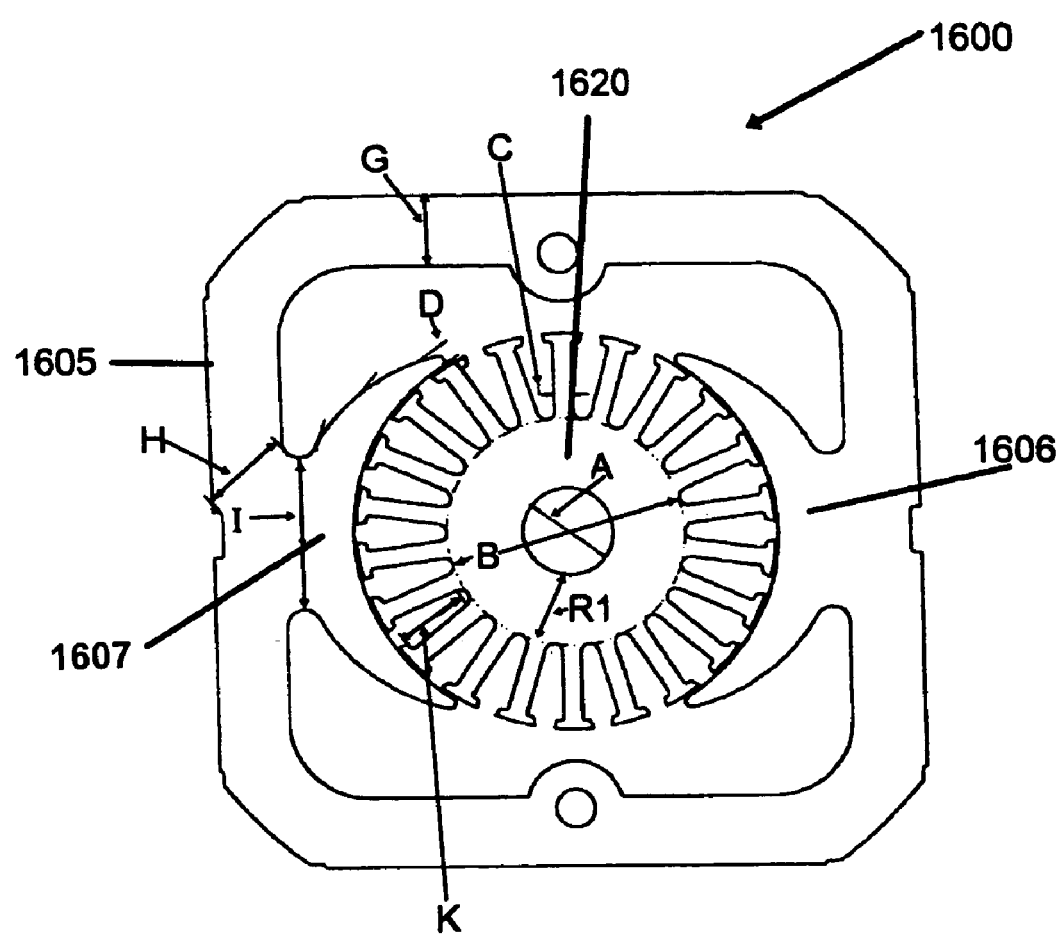
FIG. 16 depicts laminations of both a stator and a rotor for a universal motor in accordance with an embodiment of the present invention.

Referring to FIG. 16, the laminations of the stator 1605 and the rotor core 1620 for a universal motor are shown. In an embodiment of the present invention, a universal motor may comprise a stator 1605 having two electromagnetic poles 1606–1607 and a cylindrical frame rotor (armature) having distributed windings. The rotor has a shaft (not shown) and a rotor core 1620. The shaft is provided which may be rotatably mounted on the frame by suitable bearings (not shown).

Figure 17:
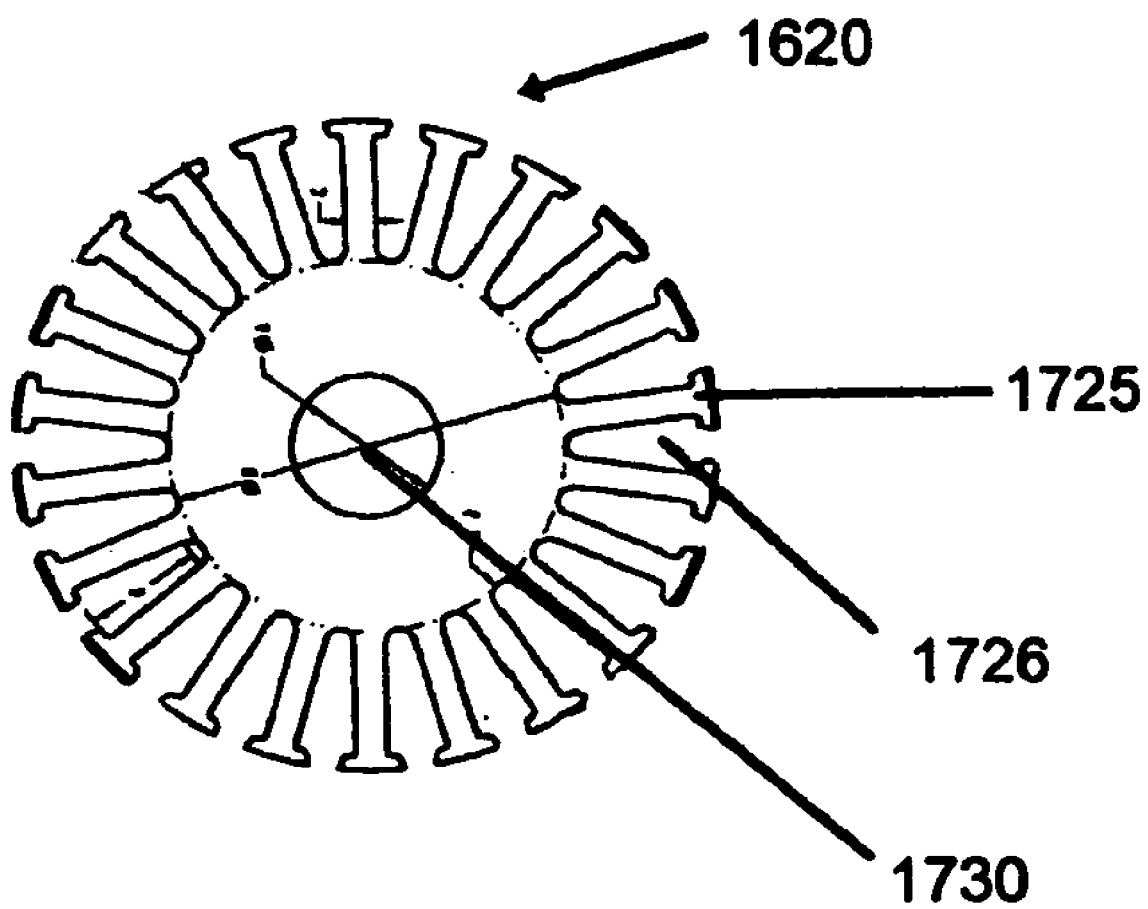
FIG. 17 depicts a lamination of an armature for a universal motor in accordance with an embodiment of the present invention.

Referring now to FIG. 17, the lamination of rotor core 1620 is shown. The rotor core 1720 is formed by stacking together laminations stamped from ferromagnetic material such as cold rolled motor lamination steel or sheet electrical steel. The laminations have a central hole 1730 and a number of radially extending T shaped teeth 1725 which form the salient poles of the rotor core 1620. The T shaped teeth 1725 may be circumferentially equal-distanced and mutually separated by grooves 1726. The rotor core 1620 may be coated with an insulating materials such as laminates composed of vulcanized fiber, polyester films and polyester mats and molded components of glass filled nylons, polyesters and polybutylene terephthalates fitted to the winding slots before the motor windings are wound about the poles of the rotor core. The windings are connected to terminals of a commutator which is secured around a portion of the shaft which is opposed to the brushes. The brushes contact the commutator to supply electricity to the windings. The optimal design of the T shaped teeth 1725 may allow the rotor to have less resistance.

Figure 18:
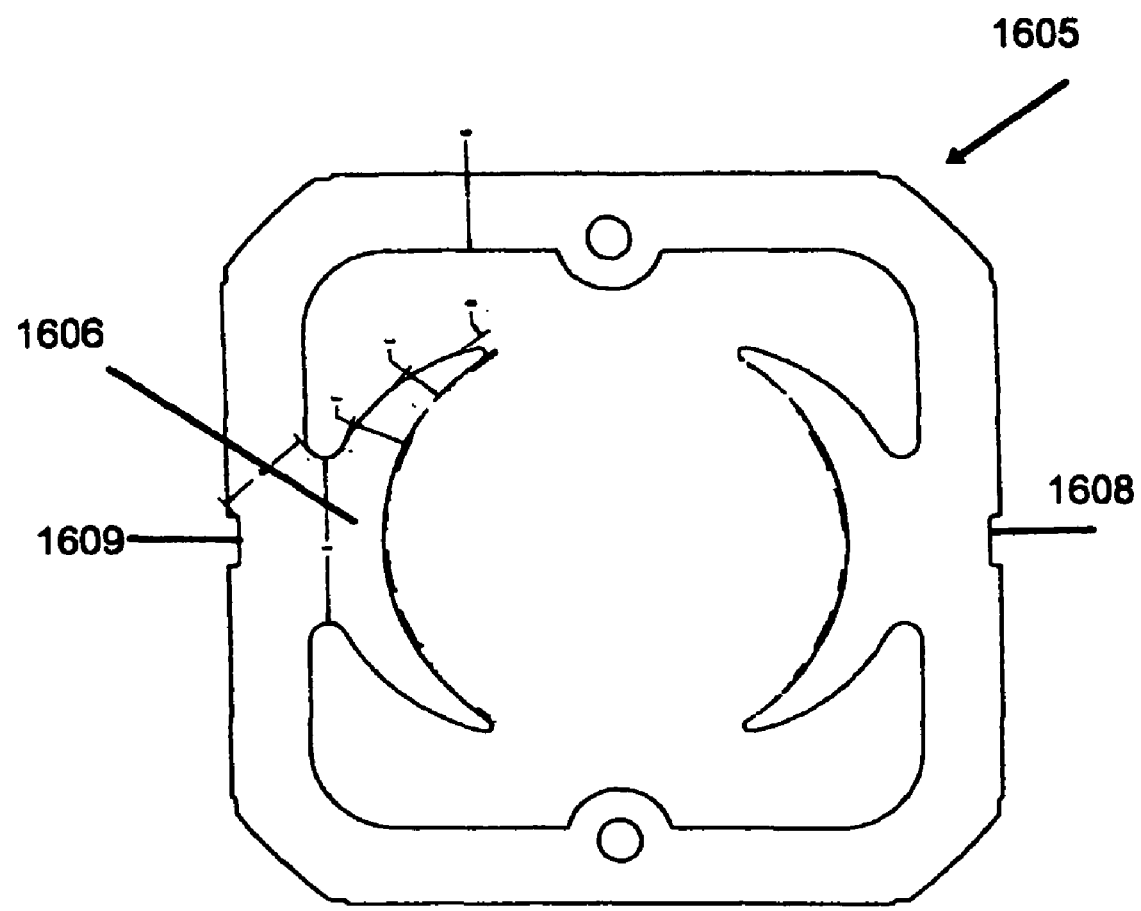
FIG. 18 depicts a lamination of a field for a universal motor in accordance with an embodiment of the present invention.

The lamination of the stator is shown in FIG. 18. The stator 1605 (field) is formed by stacking together laminations stamped from ferromagnetic material such as cold rolled motor lamination steel or sheet electrical steel. The stator 1605 may comprise two dish-shaped electromagnetic poles 1608–1609 which diametrically oppose each other. Alternatively, the stator may comprise two permanent magnets which may extend linearly in an axial direction of the stator. The dish-shaped poles 1608–1609 may substantially surround at least ⅔ of the circumference of the rotor core.

In an advantageous aspect of the present invention, in order to reduce eddy current losses in the assembled armature, a shaft of smaller cross section is used so that less magnetic flux is induced in the shaft. Upon rotation, an alternating magnetic flux is generated. The magnetic flux induced in ferrous materials with smaller grains (such as a shaft) may constitute energy loss. Therefore, the proportion of material in the shaft as related to the proportion of material in the armature lamination yoke may be reduced to minimize energy losses due to the magnetic material losses in the shaft. As a result, the efficiency of the assembled motor is improved.

Referring back to FIG. 16, detailed geometric designs of the lamination of the stator 1605 and the rotor core 1620 are also shown. The optimized geometric attributes of the motor laminations are defined by the following equations:

$G$=thickness of the field yoke of the motor $((B-A)/2)=G*1.013$ (1.013 is a constant)

$C=((2*G)/\text{coil pitch})*0.896$ (0.896 is a constant)

$D=C$ $E=2*C$ $F=3*C$ $H=G*1.274$ (1.274 is a constant)

$I=G*2*1.104$ (1.104 is a constant)

$J$=diameter of armature coil+insulation thickness $K=10*$diameter of armature coil−wedge thickness $L$=diameter of armature coil*3

In a preferred embodiment of the present invention, 0.375 inch of the thickness of the field yoke may be used. The thickness of the field yoke may have a relationship with the magnetic flux density. Therefore, the optimized thickness for the field yoke may be determined based on the type of motor. In accordance with the above defined equations, the stator 105 and the rotor 120 may be laminated with following properties:

$$G = 0.375$$

$$((B-A)/2) = G*1.013$$

$$C = ((2*G)/7)*0.896 \text{ (7 is coil pitch)}$$

$$D = C$$

$$E = 2*C$$

$$F = 3*C$$

$$H = G*1.274$$

$$I = G*2*1.104$$

$$J = 0.034 + 0.012 \text{ (0.034 is nominal diameter of bare 19.5 AWG copper magnetic wire. 0.012 is insulation thickness.)}$$

$$K = (10*0.034) - 0.030 \text{ (0.034 is nominal diameter of bare 19.5 AWG copper magnetic wire. 0.030 is wedge thickness.)}$$

$$L = 0.034*3 \text{ (0.034 is nominal diameter of bare 19.5 AWG copper magnetic wire.)}$$

In an advantageous aspect of the present invention, the length of the rotor may be reduced to 2.5 inch without compromising efficiency. In FIGS. 19A–B, efficiency data tables are shown. FIG. 19A shows the efficiency data table resulted from testing a universal motor (with 2.5 inch length motor) that utilizes the motor technique of the present invention. FIG. 19B shows the efficiency data table resulted from testing a universal motor (with 3.0 inch length motor) that utilizes the motor technique of the present invention. As shown in FIG. 19A, an embodiment of the present invention may provide 1.9 HP with 75% efficiency while initial load is 9.484 pound inch (lb-in) with 12675 RPM. As shown in FIG. 19B, an embodiment of the present invention may provide 1.9 HP with 74% efficiency while initial load is 12.090 pound inch (lb-in) with 9920 RPM. However the prior art motor may provide 1.37 HP with 54% efficiency while initial load is 6.008 lb-in with 14356 RPM. The tables in FIGS. 19A–B may indicate that the universal motor that utilizes the motor technology of the present invention may provide better efficiency and power output.

Figure 20A:
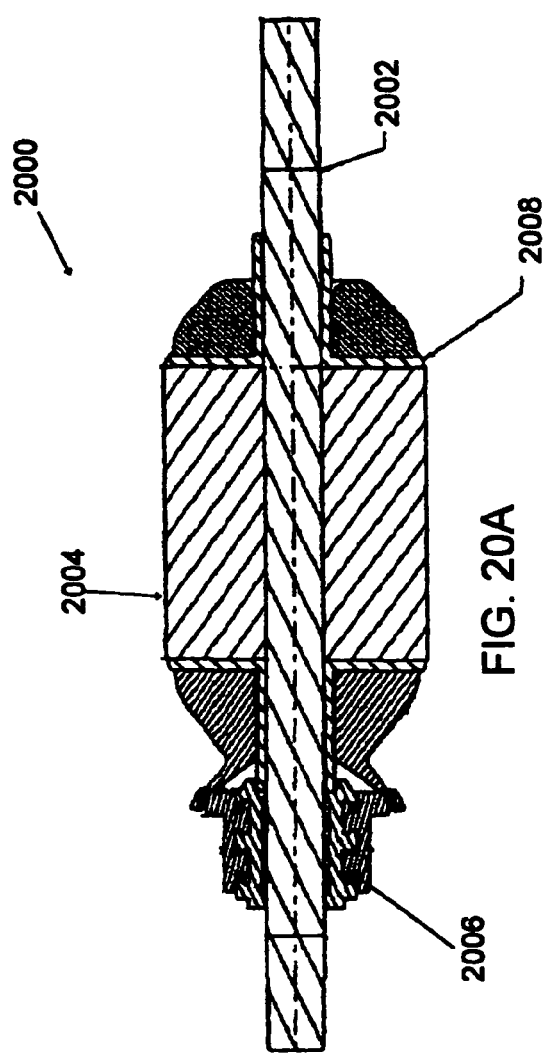
FIG. 20A is a cutaway view of a universal motor that utilize the motor technology of the present invention.
Figure 20B:
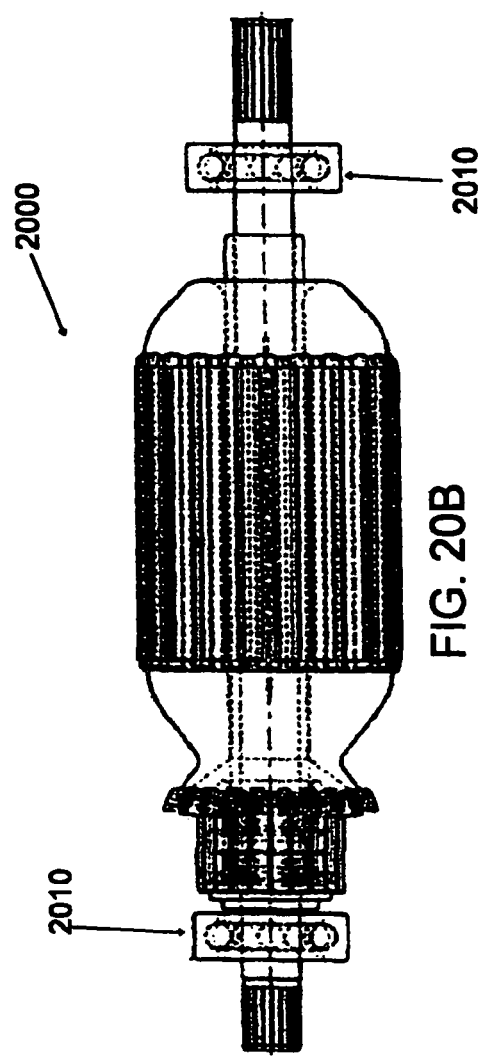
FIG. 20B depicts a motor a universal motor that utilize the motor technology of the present invention.

In FIGS. 20A–B, a universal motor 2000 in accordance with the present invention is depicted. A shaft 2002 may pass through the universal motor housing 2004 and a commutator 2006. The commutator 2006 may be a 22 bar stepped commutator. The universal motor also comprises a molded end insulator 2008 with integral tube. The shaft may be rotably mounted on the frame by suitable bearings 2010.

Figure 21:
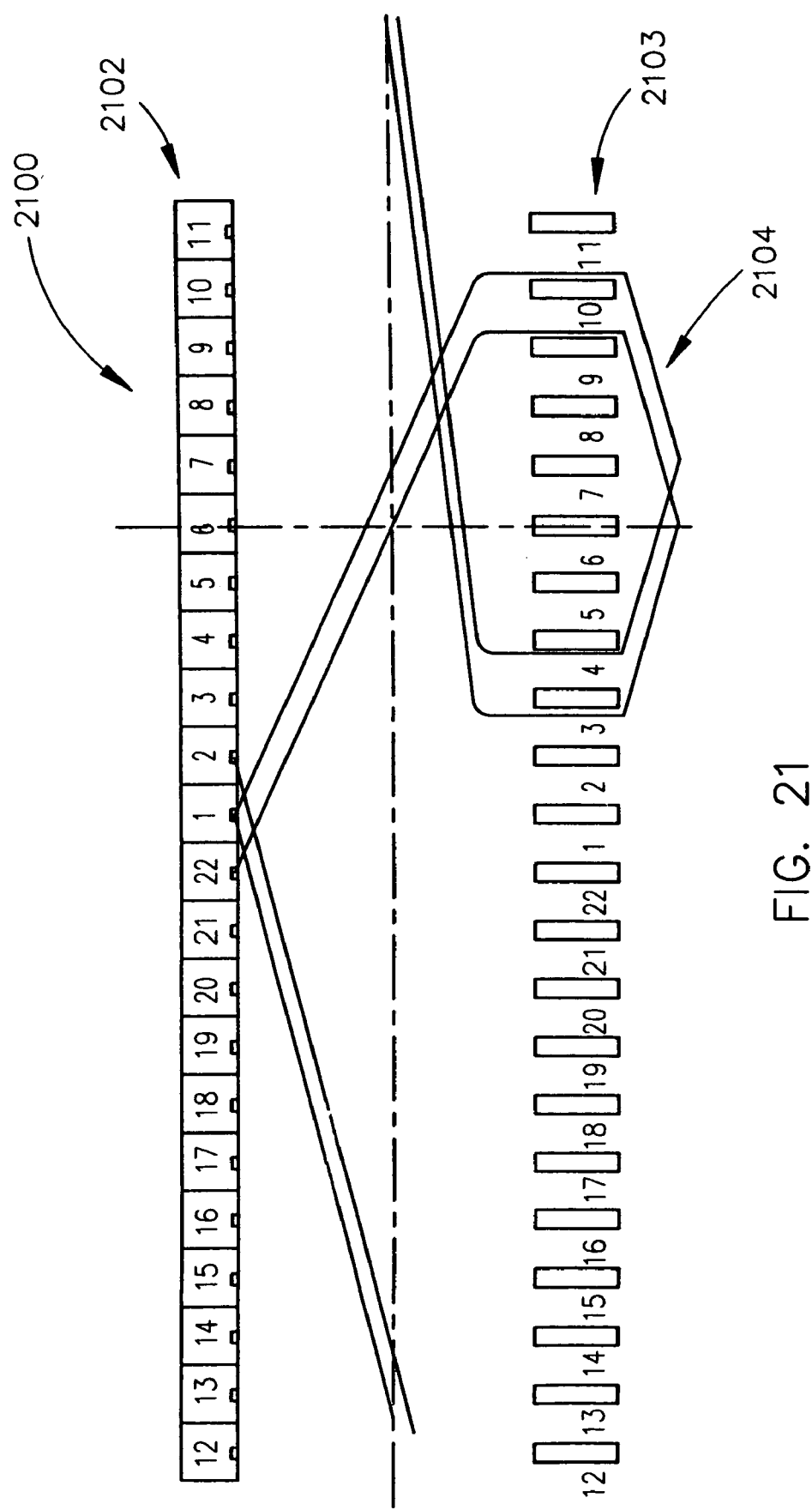
FIG. 21 depicts an armature assembly in accordance with a preferred embodiment of the present invention.

FIG. 21 depicts illustrations of armature windings in which the motor technology of the present invention may be utilized. The exemplary motor may comprise a 22 bar stepped commutator 2102 and an armature with 22 winding slots 2103. The windings are lap windings done in clockwise fashion. A series of slots 2103 accommodate the armature winding coils 2104, which are insulated from each other and from the rotor core. The ends of the coils 2104 are connected to insulated segments on the commutator 2102. It is well known in the art that there are various types of armature windings. One type of armature windings is lap which may also have a number of different configurations. This means that their arrangement can vary from the relatively simple to the complex. Lap winding is where the leads of an individual coil on the armature are connected to commutator bars that are adjacent or close to each other. FIG. 22 depicts illustrations of field assemblies in which the motor technology of the present invention may be utilized.

Figure 23:
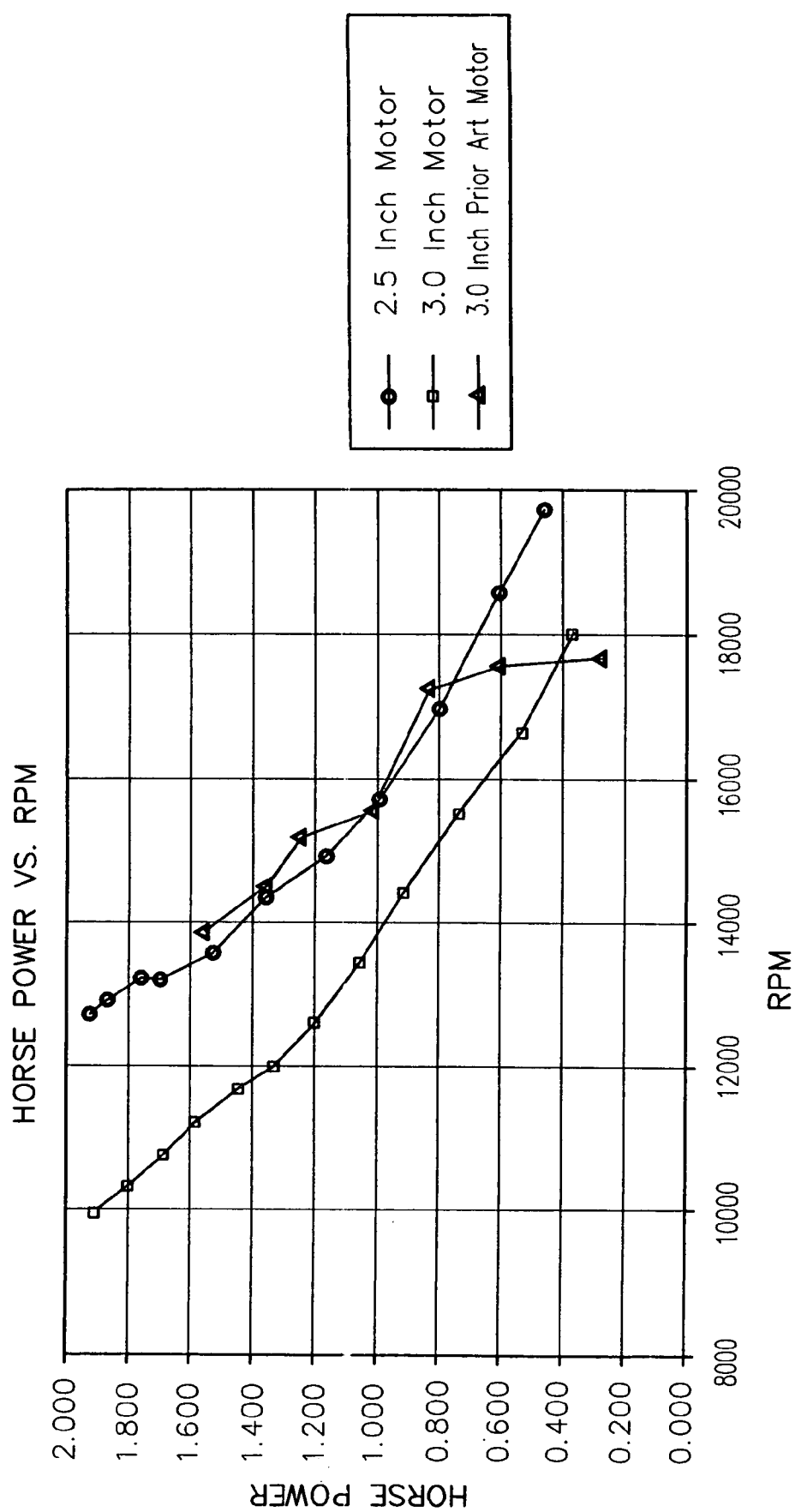
FIG. 23 depicts graphs of Horsepower versus Motor RPM for 2.5 inch and 3 inch universal motors that utilize the motor technology of the present invention and for the prior art motor.

Referring now to FIG. 23, side by side graphs of horse power versus motor RPM for two universal motors that utilizes the motor technology of the present invention and a prior art universal motor are shown. As shown in FIG. 23, the universal motors that utilize the motor technology of the present invention may produce more horsepower for a given motor size.

Figure 24:
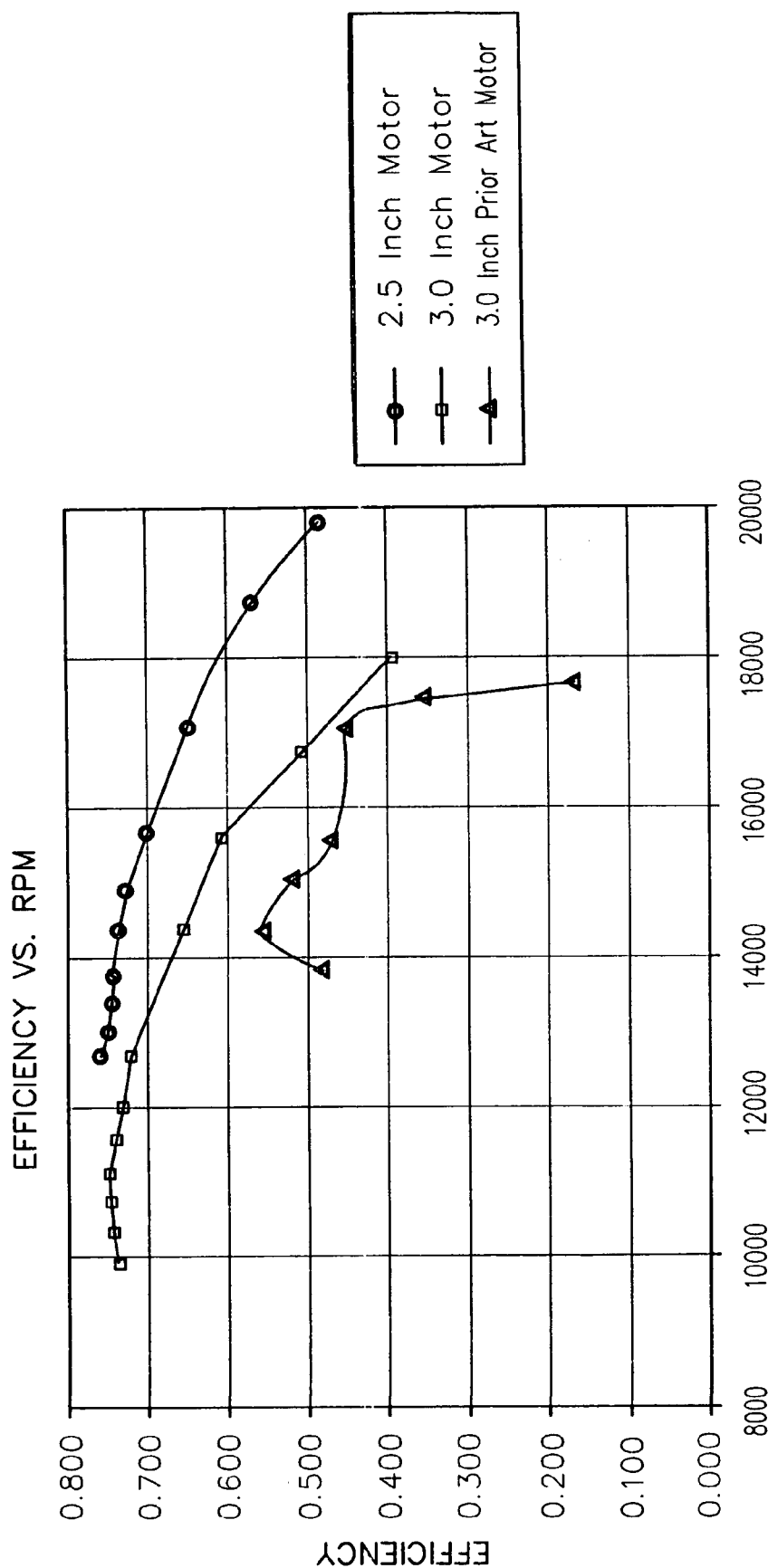
FIG. 24 depicts graphs of Efficiency versus Motor RPM for 2.5 inch and 3 inch universal motors that utilize the motor technology of the present invention and for the prior art motor.

Referring now to FIG. 24, side by side graphs of efficiency versus motor RPM for two universal motors that utilize the motor technology of the present invention and a prior art universal motor are shown. As shown in FIG. 24, the universal motors that utilize the motor technology of the present invention may produce more efficiency for a given motor size.

FIG. 25 shows a table comparing data of armature and stator windings in a universal motors of 2.5 and 3.0 inch stack lengths that utilizes the motor technology of the present invention and the prior art motor. For example, the resistances of motors of the present invention are lower than the resistances of the prior art motor.

Figure 26:
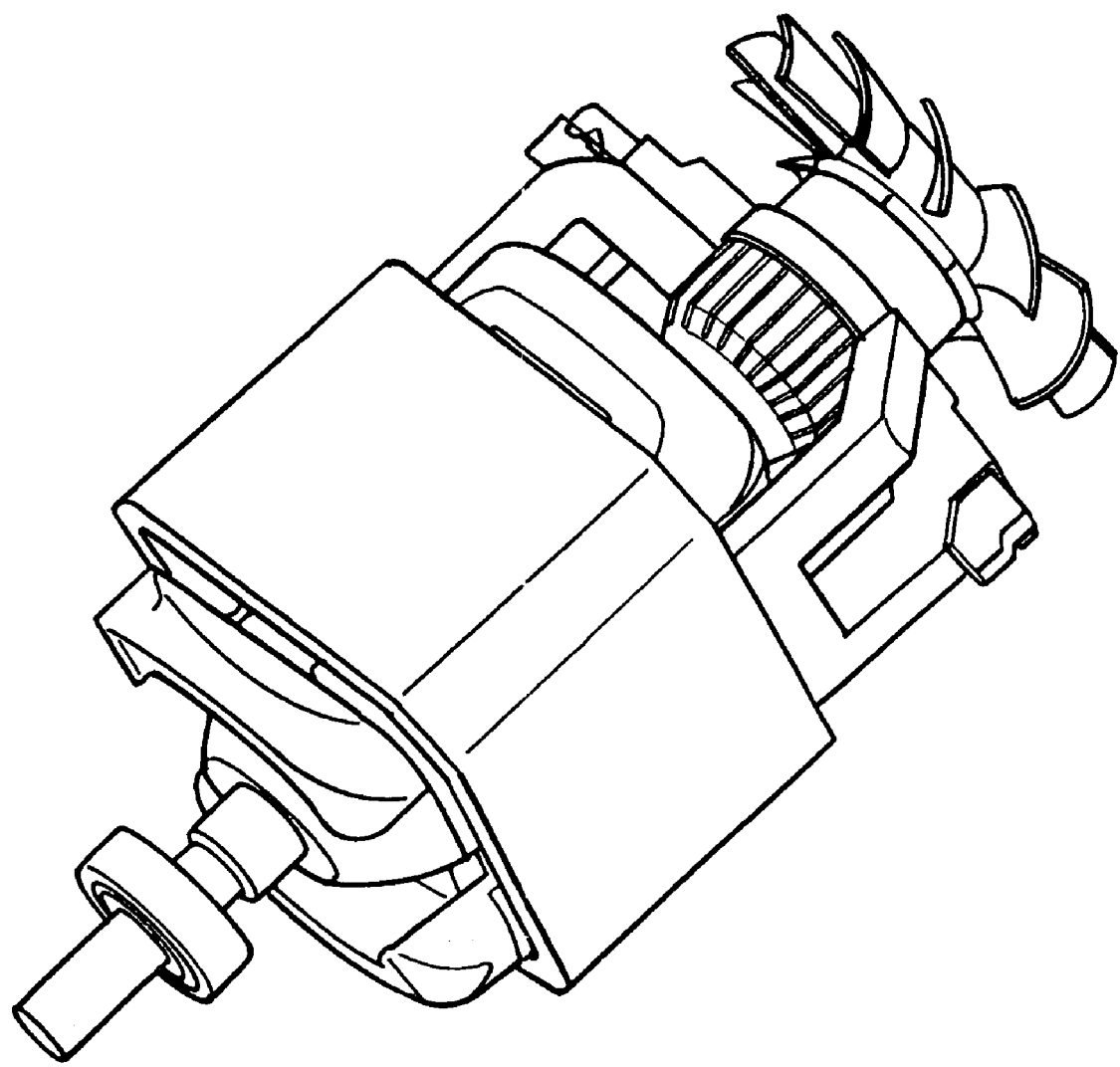
FIGS. 26–27 depict illustrations of power tools in which the motor technology of the present invention may be utilized.
Figure 27:
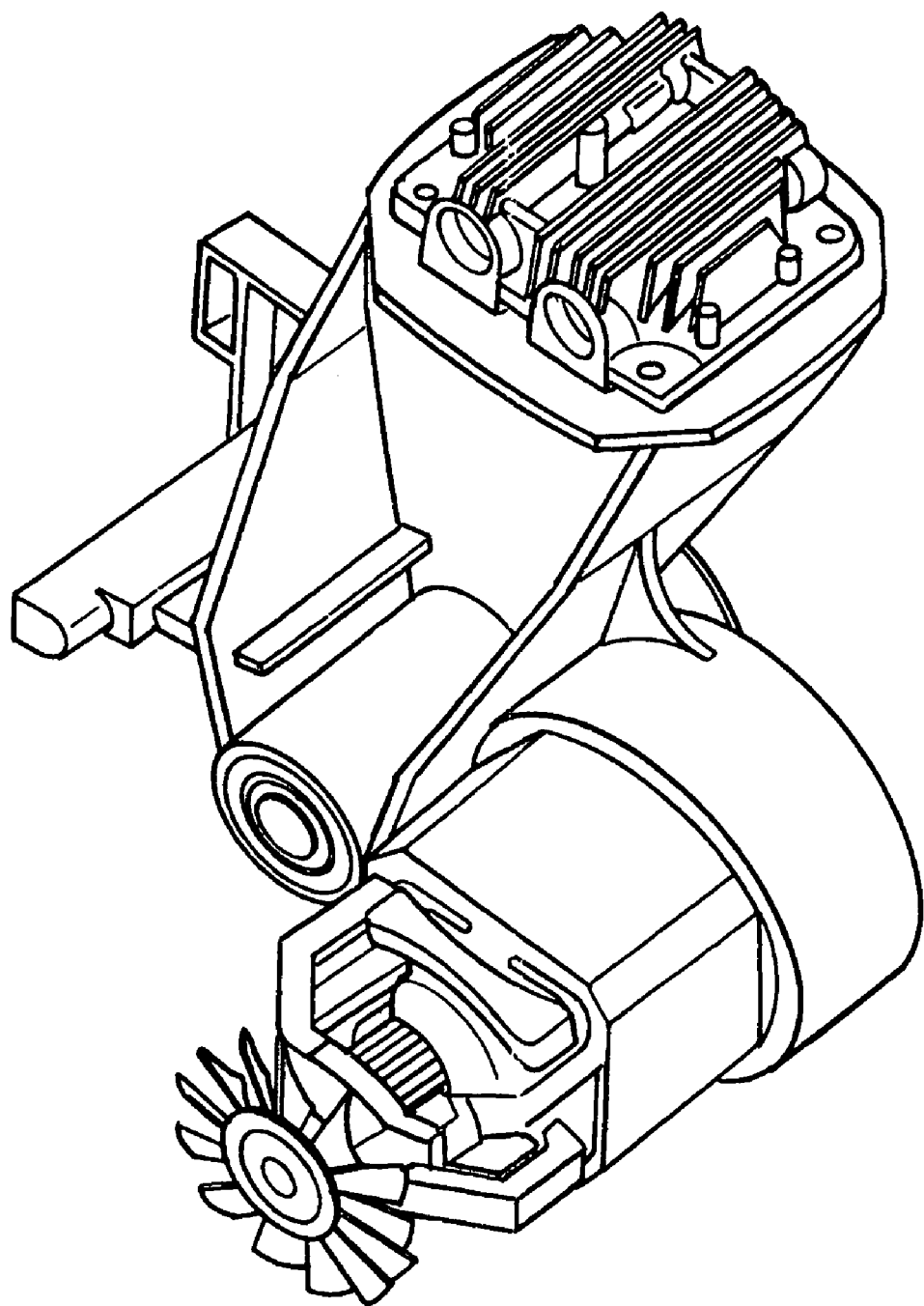

FIGS. 26–27 depict illustrations of power tools in which the motor technology of the present invention may be utilized. One of the examples of the power tools may be an air compressor.

It is believed that the efficient motor of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A motor comprising:
   a stator having two electromagnetic poles diametrically oppose each other;
   a rotor including a rotor core rotatably mounted with a shaft, said rotor core being formed by stacking a plurality of laminations which has a central bore and a plurality of T shaped teeth which are radially extending; and
   a commutator being mounted on said shaft, said commutator being delivered electric power from brushes and connected to said rotor core,
   wherein said plurality of T shaped teeth form salient poles of said rotor core, and
   wherein said stator and said rotor have geometric attributes such that:

$$R1 = G*1.013,$$

wherein G is defined as thickness of a field yoke, R1 is defined as a distance from a center of said central hole to an end of a groove which separates said plurality of T shaped teeth.

2. The motor as in claim 1, wherein said rotor core is coated with an insulating material.

3. The motor as in claim 1, wherein said two electromagnetic poles are dish shaped surrounding at least ⅔ of circumference of said rotor core.

4. The motor as in claim 1, wherein a proportion of material in said shaft is calculated to prevent energy losses to magnetic material losses in said shaft.

5. The motor as in claim 1, wherein said stator and said rotor have geometric attributes such that:

$$C=((2*G)/\text{coil pitch})*0.896,$$

wherein C is defined as a thickness of each of said plurality of T shaped teeth.

6. The motor as in claim 1, wherein said stator and said rotor have geometric attributes such that:

$$I=G*2*1.104,$$

wherein I is defined as a thickness of a bottom part of a dish shaped electromagnetic pole.

7. The motor as in claim 6, wherein said stator and said rotor have geometric attributes such that:

$$H=G*1.274,$$

wherein H is defined as a diagonal thickness of said field yoke where said bottom part of said dish shaped electromagnetic pole is attached.

8. The motor as in claim 7, wherein thickness of said dish shaped electromagnetic pole is determined based on thickness of said field yoke.

9. The motor as in claim 1, wherein the motor is a universal motor having a 2.5 inch length.

10. The motor as in claim 1, wherein the motor is a universal motor having a 3.0 inch length.

11. The motor as in claim 1, wherein the motor provides 1.9 HP with efficiency of at least 74%.

12. A universal motor providing 1.9 HP at 120 Volts, comprising;
- a frame accommodating a plurality of components of said motor;
- a stator having two magnetic poles which diametrically oppose each other, said two magnetic poles formed in dish shape;
- a rotor including a rotor core being formed by stacking a plurality of laminations which have a central hole and a plurality of T shaped teeth which are radially extending, said rotor core rotatable mounted with a shaft, said shaft mounted on said frame by at least two bearings; and
- a commutator being a mounted on said shaft, said commutator being delivered electric power from brushes and electrically connected to said rotor core, wherein said stator and said rotor have geometric attributes such that:

$$R1=G*1.013;$$

$$C=((2*G)/\text{coil pitch})*0.896;$$

$$H=G*1.274; \text{ and}$$

$$I=G*2*1.104,$$

wherein G is defined as thickness of a field yoke, R1 is defined as a distance from a center of said central hole to an end of a groove which separates said plurality of T shaped teeth, C is defined as a thickness of each of said plurality of T shaped teeth, I is defined as a thickness of a bottom part of a dish shaped electromagnetic pole and H is defined as a diagonal thickness of said field yoke where said bottom part of said dish shaped electromagnetic pole is attached.

13. The universal motor as in claim 12, wherein said plurality of T shaped teeth form a plurality of salient poles of said rotor core, said plurality of salient poles wounded by an armature winding.

14. The universal motor as in claim 12, wherein said T shaped teeth are made of ferromagnetic material.

15. The universal motor as in claim 12, wherein said rotor core is coated with an insulating material.

16. The universal motor as in claim 12, wherein said two magnetic poles are dish shaped electromagnetic poles surrounding at least ⅔ of circumference of said rotor core.

17. The universal motor as in claim 12, wherein thickness of said dish shaped electromagnetic pole is determined based on thickness of said field yoke.

18. The universal motor as in claim 12, wherein the motor is a universal motor having a 2.5 inch length.

19. The universal motor as in claim 12, wherein the motor is a universal motor having a 3.0 inch length.

20. The universal motor as in claim 12, wherein the motor provides 1.9 HP with efficiency of at least 74%.

* * * * *